United States Patent [19]

Hilty

[11] 4,088,575
[45] May 9, 1978

[54] AUTOMATIC SYSTEM CLEANER FOR REMOTE MONITOR

[76] Inventor: Jon D. Hilty, 125 Wolf Creek St., Brookville, Ohio 45309

[21] Appl. No.: 770,710

[22] Filed: Feb. 22, 1977

Related U.S. Application Data

[63] Continuation of Ser. No. 580,623, May 27, 1975, abandoned.

[51] Int. Cl.[2] .................................... C02B 3/06

[52] U.S. Cl. .................................... 210/64; 210/170; 210/205

[58] Field of Search .................... 210/60, 62, 154, 169, 210/170, 85, 198 R, 205, 206, 64

[56] References Cited

U.S. PATENT DOCUMENTS

| | | | |
|---|---|---|---|
| 2,055,808 | 9/1936 | Wait | 210/170 |
| 2,073,784 | 3/1937 | Day | 210/60 |
| 2,355,564 | 8/1944 | Sebald | 210/60 |
| 2,999,797 | 9/1961 | Campbell | 210/62 |
| 3,080,315 | 3/1963 | Silvey | 210/62 |
| 3,138,552 | 6/1964 | Richards | 210/169 |
| 3,365,064 | 1/1968 | Horan | 210/169 |
| 3,374,065 | 3/1968 | Suzuki | 23/253 |
| 3,672,508 | 6/1972 | Simon | 210/169 |
| 3,928,197 | 12/1975 | Horan et al. | 210/62 |

FOREIGN PATENT DOCUMENTS 1,141,101 12/1962 Germany.

*Primary Examiner*—Thomas G. Wyse
*Attorney, Agent, or Firm*—Dybvig & Dybvig

[57] ABSTRACT

Means are disclosed for introducing a biological poison to water being removed from a lake or stream for presentation to an automatically operating water quality monitoring system. The poison introducing means is operative at only periodic intervals; and, when operating to introduce poison, a sampling device of the monitoring system is disabled to preserve its accuracy. The monitoring system is otherwise permitted to operate routinely during the time the poison is present in the system. The poison is admixed to the water promptly as the water is introduced to the monitoring system, with the result that the biological poison will cleanse the entire monitoring system by killing biological slime otherwise adhering to the exposed surfaces within the system. The biological poison also maintains sensor sensitivity within the monitoring system. The biological poison further suppresses biological activity in the water being monitored, thus preserving sample values that would otherwise have changed as the water being sampled advanced to remotely located monitoring equipment.

11 Claims, 5 Drawing Figures

O = OPEN CIRCUIT
C = CLOSED CIRCUIT

AUTOMATIC SYSTEM CLEANER FOR REMOTE MONITOR

This is a continuation, of application Ser. No. 580,623, filed May 27, 1975 for AUTOMATIC SYSTEM CLEANER FOR REMOTE MONITOR, now abandoned.

BACKGROUND OF THE INVENTION

1. Field of the Invention

The present invention relates to the monitoring of specimens in which biological activities may occur and, more particularly, to the automatic monitoring of water specimens or samples removed from lakes and streams.

2. The Prior Art

It is a common practice to locate water monitoring equipment remotely from a lake or stream so as to protect the monitoring equipment from damage resulting from flooding, wind driven water, tides and the like. A problem commonly encountered, particularly in warm weather, is that continuing biological activity occurring in the water being sampled causes the sample which is monitored remotely to be not truly representative of the water at the instant the water was removed from the lake or stream. A further problem is that the continuing biological activity produces a biological slime which grows on all surfaces contacted by the water being sampled. The slime is particularly injurious to the various equipment which is to be contacted with the sampled water for purposes of monitoring and is frequently the cause of invalid data.

It has been a practice in the prior art to protect monitoring instruments by adding to the water sampled a biological poison, such as a chlorine compound, at a location adjacent the monitoring instrument to protect only the monitoring equipment.

German Auslegeschrift No. 1,141,101 illustrates the prior art technique of introducing a biological poison adjacent the monitoring equipment. Dutch Application No. 7,017,124 and U.S. Pat. No. 3,374,065 illustrate monitoring techniques employed for the measurement of biochemical oxygen demand.

SUMMARY OF THE PRESENT INVENTION

In the present invention, disadvantages attending the prior art monitoring equipment are removed by providing an automatically timed apparatus for periodically introducing a biological poison to the water being sampled immediately as the sample is being withdrawn from its source. The periodic introduction of the biological poison functions as a complete system protector to keep all exposed surfaces throughout the monitoring system free of slime accumulations.

The present invention also provides backwashing means to preserve the cleanliness of the mechanism which pumps the water being sampled to monitoring devices and operates to enhance the effectiveness of the monitoring and sampling devices.

DESCRIPTION OF THE PREFERRED EMBODIMENT

Figure 1:
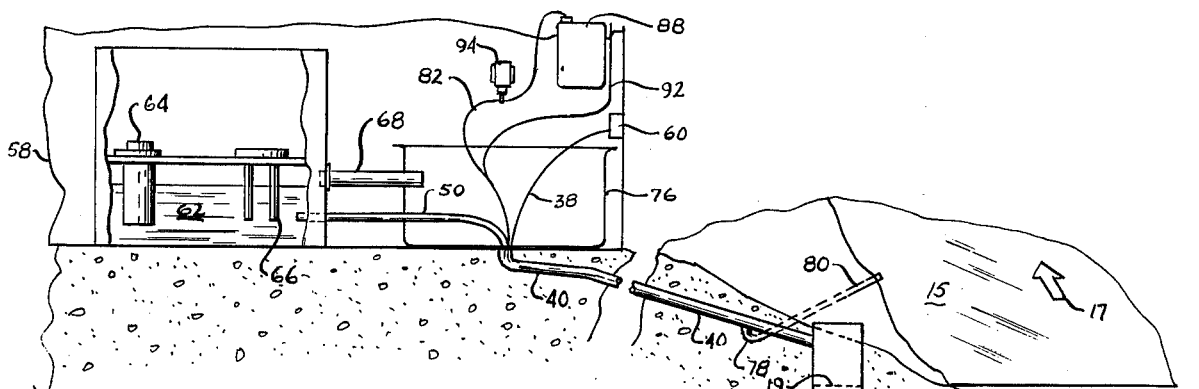
FIG. 1 is a broken-apart section view taken through a river bank and an adjacent river combined with a perspective illustration of the river and its bank behind the sectional cut to schematically illustrate a river water monitoring system in accordance with the present invention, portions being broken away to reveal interior construction.
Figure 2:
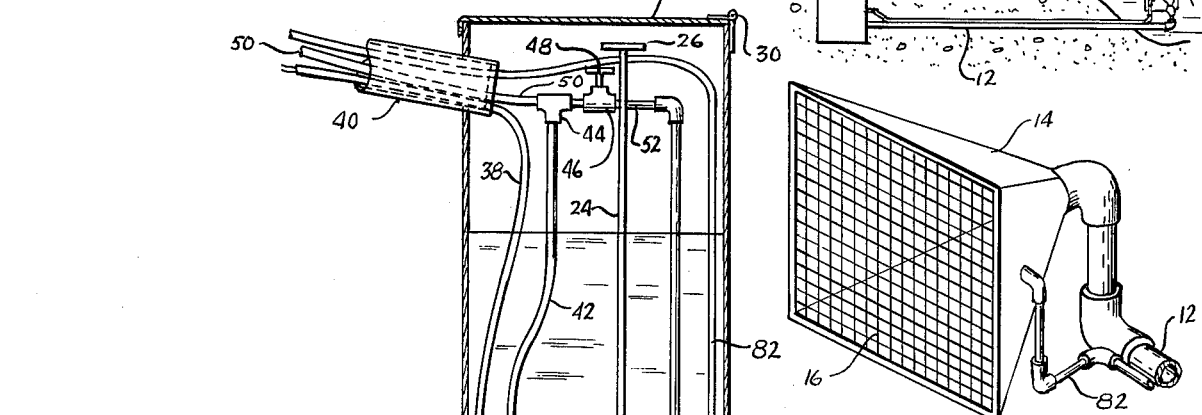
FIG. 2 is an enlarged perspective illustration with portions broken away illustrating the monitor intake.

It is conventional in systems which are designed for use in monitoring the character of river water to utilize a stilling well which is at least partially buried in a bank of the river and which is connected by means of a pipe to an inlet which is submerged in the river water. A stilling well identified by the reference number 10 is shown in FIG. 1 and appears in greater detail in FIG. 3. A pipe 12 buried in the river bank communicates from the stilling well to an intake 14, which is located in a river 15 at a sufficiently low level that periodic fluctuations in the level of the river will not ordinarily carry the river to a level below that of the intake 14.

An arrow 17 appearing in FIG. 1 illustrates the direction in which the river water flows. A broken line 19 illustrates the corresponding water level in the stilling well. The intake 14 is in the shape of a rectangular horn, the mouth of which diverges in the direction of water flow. The mouth of the horn is covered by a screen 16, which serves as a fish guard. It will be noted that the area of the screen 16 is substantially larger than the cross sectional area of the pipe 12. The hydraulic head of water at the intake 14 causes water to flow through the intake 14 and the pipe 12 to the stilling well; but since the screen 16 is much larger in area than the pipe 12, there will not be a strong current at the screen 16 which will tend to draw leaves, twigs and other debris flowing with the river into the intake 14. This being the case, the normal river current will cause such debris to be deflected by the divergent exterior of the intake 14 away from the mouth of the intake. Thus such debris is not encouraged to enter the intake.

Figure 3:
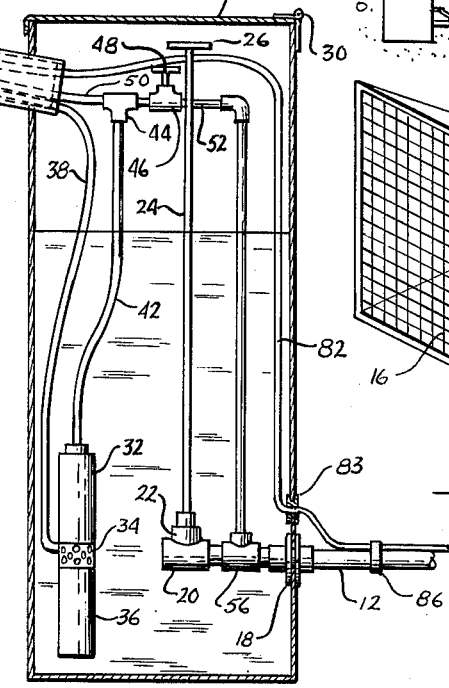
FIG. 3 is a section view illustrating the interior construction of a stilling well in accordance with the present invention.

As appears in FIG. 3, the pipe 12 enters a lower portion of the stilling well 10, gasket means 18 sealing the opening to the stilling well through which the pipe enters the stilling well. The pipe 12 empties into the stilling well through a valve pipe 20, which is part of a valve 22, which may be used to close off the flow of water to the stilling well. An operating rod 24 connects from the valve 22 to a valve operator 26 located near the top of the stilling well 10. The stilling well is closed with a cover 28 hinged at 30 so that the cover may be lifted, thus allowing a manual manipulation of the operator 26.

Located within the stilling well opposite the opening of the valve 22 is a submersible pump 32 having an inlet sieve 34, the pump 32 being supported in an elevated position within the stilling well by means of a pump driving motor 36, which extends downwardly from the sieve 34.

A power cable 38 has electrical connection to the motor 36 through one of the perforations in the sieve 34. The power cable 38 enters the stilling well 10 near the top of the stilling well through a protective tube 40. The tube 40 extends underground to a higher elevation where connections are made to an instrument shelter and where electrical power is applied to the cable 38 so as to supply the necessary power for operating the pump motor 36.

The pump 32 charges water pumped thereby through a pressure hose 42, which connects to a T joint 44. One side of the T joint 44 connects to a valve 46 having an operator 48 accessible by lifting the cover 28. The valve 46, which is normally closed, communicates through a pipe section 52 to a T section 56, which connects between the aforementioned valve pipe 20 and the inlet pipe 12.

When the valve 46 is open and the valve 22 is closed, the pump 32, if operating, can be used to backwash the pipe 12 to the intake 14. Ordinarily, however, the valve 46 closes the pipe 52, and the valve 22 is open so as to give stream water free access to the stilling well 10. Of course, while the valve 22 remains open, the level of water in the stilling well 10 will be substantially equal to the level of water flowing in the stream 15.

As appears in FIG. 1, the protective tube 40 takes a vertically rising underground course to the base of an instrument shelter 58. Traveling interiorly of the tube 40 is the pressure hose 50 through which water driven by the pump 32 is conveyed to the shelter 58. Also traveling interiorly through the tube 40 adjacent the hose 50 is the power cable 38. Within the instrument shelter 58 the cable 38 makes connections to a power supply box 60 from which electrical power suitable for operating the pump motor 36 is received.

Also within the interior of the instrument shelter, the pressure hose, which is conveying water from the stilling well 10, connects to a sensor well 62, which presents the river water to sensing and sampling instruments schematically shown at 64 and 66, respectively. Water from the hose 50 enters the sensor well 62, contacts the sensing and sampling instruments, and then flows out of the well 62 through a drain pipe 68.

Those skilled in the art will understand that the sampling device shown at 66 is highly schematic. Thus the sampler may be a composite sampler which periodically extracts measured quantities of water and comingles the extracted quantities in a single container, not shown. Alternately, the sampling device may be a grab sampler in which measured quantities of water are periodically extracted and the successive extracts separately stored in individual containers, not shown, for later analysis. For the purposes of the present invention, it suffices to identify the instrument 64 as the sample extracting portion of a composite sampler.

The river water is permitted to drain to a sump 76. From the sump 76, the water is permitted to drain through the protective tube 40. As the water drains downwardly through the tube 40, it encounters a Y connection 78, which allows the water to drain through a discharge tube 80, which returns the water to the stream 15 at a point which is substantially downstream of the intake 14.

It is preferred that the lower end of the protective tube 40 which projects into the stilling well be closed except for any tubes and cables extending between the instrument shelter and the stilling well through the interior of the tube 40. Thus it is not desired that water draining from the instrument shelter be returned to the stilling well.

With the exception of the construction of the intake 14, all features of the monitoring system heretofore described are features well known in the art. For the practice of the present invention, there has been added to the structure already described a container 88 which contains a supply of a suitable biological poison, such as sodium hypochlorite. Subject to regulation by means of a solenoid control valve to be described, the poison is permitted to drain from the container 88 through a tube 82, which enters the protective tube 40 and follows a course interiorly of the tube 40 alongside the hose 50 and the power cable 38. Due to its downward course, the tube 82 operates as a siphon. When the tube 82 reaches the stilling well 10, the tube 82 is permitted to exit the stilling well alongside the pipe 12. A suitable grommet 83 sealingly engages the tube 82 so as to minimize any leakage of water between the stilling well and the ground in which the stilling well is partially buried. Suitable straps 86 are used to tie the tube 82 to the pipe 12 so that the tube 82, which may be a plastic, is supported against river currents.

The tube 82 follows alongside the pipe 12 toward the intake 14 where the tube 82 is connected by means of an elbow 84 to the interior of the intake 14 at a point closely adjacent the screen 16.

As previously indicated, the flow of poison from the container 88 to the intake 14 is subject to the regulation of a solenoid valve mechanism. This solenoid valve mechanism includes a solenoid 94 shown in FIG. 4. The solenoid 94, when energized, lifts an armature 96 against the force of gravity. The armature 96 is shaped to resemble a U-shaped hasp slideable in an anvil member 98. The hose 82 connecting from the poison container 88 passes between the armature 96 and the anvil 98. As a consequence, when the solenoid 94 is energized, the hose 90 is pinched to terminate any siphoning of poison from the container 88. When the solenoid 94 is de-energized, the armature 96 is permitted to drop, thus to permit poison to flow from the container 88 to the tube 82 and from there to the intake 14.

A pressure vent 92, making a Y connection to the tube 82, permits all of the poison to drain from the tube 82 therebelow, even though the armature 96 has been clamped against the tube 90 by operation of the solenoid 94.

Figure 4:
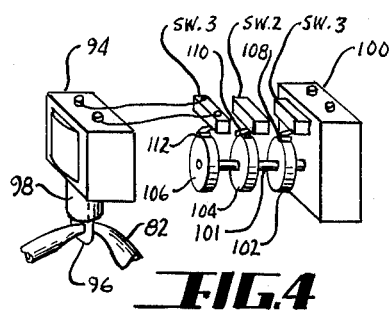
FIG. 4 is a fragmentary perspective view illustrating a cycle timing mechanism in accordance with the present invention.

The operation of the solenoid 94 is controlled by a clock mechanism 100 shown in FIG. 4. Contrary to conventional clocks which rotate the hour hand once every twelve hours, the clock mechanism 100 is designed to rotate a cam shaft 101 only 360° about its own axis in each twenty-four hour period. The shaft 101 is drivingly engaged to three cams numbered 102, 104 and 106. The movement of the cam 102 is followed by a cam follower 108, which operates a switch labeled SW 1, which respectively opens and closes the power supply to the cable 38 and thus to the submersible pump 32. The clock 100 and its associated cams may be located on a wall of the instrument shelter.

The movement of the cam 104 is followed by a cam follower 110, which regulates the position of a switch labeled SW 2. The switch SW 2 regulates the supply of power to the instrument 66, earlier identified as part of a composite sampler.

The movement of the cam 106 is followed by a cam follower 112, which controls a switch SW 3. As shown, the switch SW 3 controls the supply of electrical power to the solenoid 94.

Figure 5:
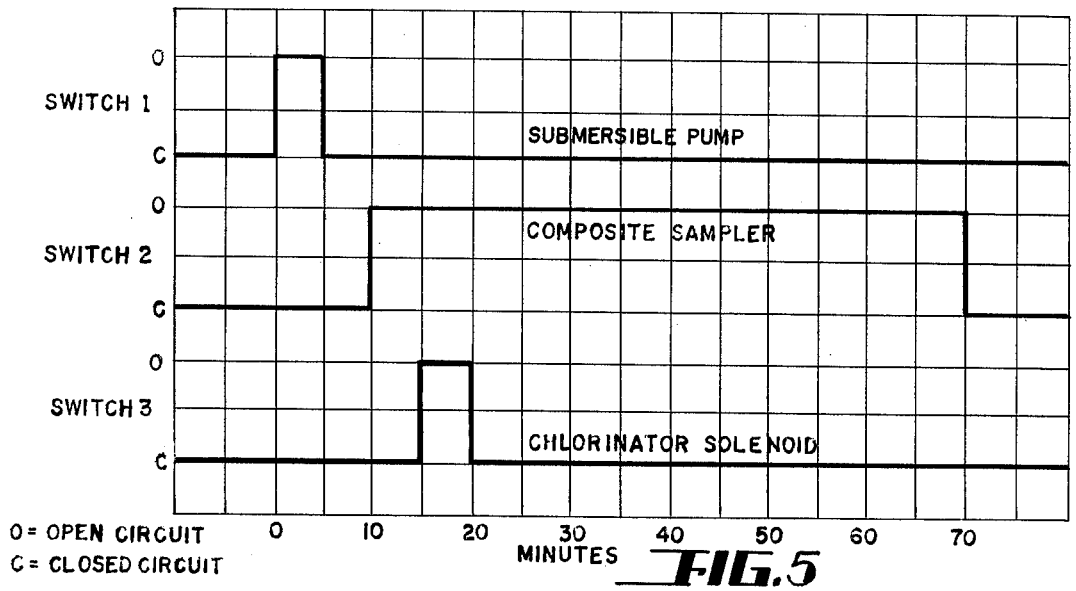
FIG. 5 is a diagram with explanatory legends illustrating an operating cycle suitable for the present invention.

FIG. 5 illustrates the open and closed conditions of the switches SW 1, SW 2 and SW 3 over a 90 minute period. It will be noted that at the beginning of the period illustrated (left side of FIG. 5), each of the switches is closed. Likewise, at the end of the period illustrated, each of the switches is again closed. For the remainder of each twenty-four hour day, the switches SW 1, SW 2 and SW 3 all remain closed; and, accordingly, the switches are open only during the limited time periods illustrated in FIG. 5.

For purposes of describing an operating cycle suitable for the present invention, a cycle may be considered to start at the time "0" on the time scale illustrated in FIG. 5. It will be noted, of course, that in the 10 minutes preceding time "0", each of the switches SW 1, SW 2 and SW 3 was in its closed state. At time "0", the cam 102 positioned the cam follower 108 to open the switch SW 1. This interrupts the power to the pump 32. The pump thus is disabled for a brief period arbitrarily shown as 5 minutes. During this period water that had been previously pumped toward the instrument shelter 58 is permitted to backflow toward the pump 32 and into the stilling well 10 through the sieve 34. To enable this function, a poppet valve normally present in such pumps and which would enable pump de-energization without backflow was removed from the pump prior to installation of the pump in the stilling well. The pump 32 is thus a backwashable pump. The backwashing serves the twofold purpose of rinsing the pump impellers of accumulating debris and clearing the sieve 34 so that leaves and other debris that may have been drawn to the sieve 34 by operation of the pump are permitted to fall away. This minimizes the possibility that debris attracted to and retarded by the sieve might blind the sieve.

After the sieve 34 has been backwashed, the cam 102 advances to permit the switch SW 1 to close, whereupon the pump resumes operation.

As shown, the composite sampler may be permitted to continue operation as the sieve 34 is being backwashed. However, approximately 5 minutes after the pump 32 resumes operation, the composite sampler is disabled by operation of the cam 104, which now displaces the cam follower 110 to interrupt the supply of power to the composite sampler. The reason for interrupting the operation of the composite sampler is to isolate the samples taken thereby from a surge of biological poison which is about to follow.

Approximately five minutes after interrupting the operation of the composite sampler, the cam 106 reaches a position where its cam follower 112 interrupts the supply of power to the solenoid 94. When the circuit to the solenoid 94 opens, the armature 96 drops away from the anvil 98, permitting biological poison to flow through the tube 82 to reach approximately the downstream face of the intake 14. It is important to note that at this time, the pump 32 is operating, thus displacing water from inside the stilling well toward the instrument shelter. Except for the presence of the intake 14 and the connecting pipe 12, the water level in the stilling well would be expected to drop. However, the stilling well and the river always seek to maintain the same level; and, accordingly, water advanced by the pump toward the instrument shelter is promptly replaced by an inflow of river water through the pipe 12 to the stilling well. Since the pump 32 is in continuous operation, except for the limited interval during which the sieve 34 is backwashed, there is a substantially continuous inflow of water from the river through the pipe 12 and the intake 14, which function as a means to withdraw water from the river.

The pipe 12 enters the stilling well substantially opposite the sieve 34. Thus the continuous inflow of water from the pipe 12 and the continuous outflow of water through the sieve 34 will create a condition wherein the incoming river water is permitted to flow rather directly to the sieve 34, even though a substantial volume of relatively quiescent water may reside in the stilling well above the level of the pipe 12.

The solenoid 94 is de-energized for a period of only approximately five minutes, during which the hypochlorite solution flows down the tube 82 to reach the downstream end of the inlet 14. Since the pump 32 is operating continuously during this period and for a prolonged time thereafter, the action of the pump 32 will be to draw substantially all water to which the hypochlorite solution has been admixed toward the stilling well 10. Thus, due to the action of the pump 32, there will be a continuous migration of river water through the screen 16 toward the pipe 12 and little tendency of the hypochlorite solution to escape into the river.

Since the hypochlorite solution moves rather directly across the stilling well to the sieve 34, there is little opportunity for the hypochlorite solution to diffuse throughout the stilling well; and in practice it is found that within approximately one hour after the hypochlorite dose has been terminated by operation of the solenoid 94, the sodium hypochlorite solution is effectively purged from the system. This time will, of course, vary with the size of the system. The composite sampler operation is thus resumed approximately 50 minutes after the hypochlorite dose is terminated.

The periodic introduction of a biological poison to the entire monitoring system in the fashion taught by the present invention offers the advantage that during at least 23 hours of each day the water quality monitoring devices are permitted to monitor water in which the growth of biological slime has been stopped or at least markedly suppressed; and, therefore, the water seen by the monitoring devices is reasonably representative of the water actually flowing in the river.

A second advantage from the present invention has to do with the maintenance of the monitoring equipment. As well known to those skilled in the art, biological growth will tend to occur on all parts of the system. Thus a biological slime will tend to develop within the pipe 12, within the stilling well, and most importantly on the exposed surfaces of the monitoring equipment, including sensors. In the practice of the present invention, it was found that daily doses of the biological poison function effectively to eliminate slime development in the pipe 12, in the stilling well, and on the surfaces of the monitor and sensors. Prior to the present invention, it was necessary at periodic intervals, such as weekly intervals, to interrupt the monitoring operation so as to manually remove accumulated slime from the monitoring equipment and other portions of the ducts or pipes through which the water to be monitored passes so as to attempt to maintain a satisfactory operation of the system. With periodic doses of the biological poison to the entire monitoring system, however, it is found that no manual cleaning of the monitoring instrumentation or the ducts or pipes through which the water flows is required.

The present invention has been practiced in a monitoring installation having a cylindrical stilling well approximately 33 inches in diameter and approximately 6 feet in height. The stilling well was connected to an inlet horn submerged in river water by a 2 inch diameter galvanized pipe. A submersible pump having a discharge capacity of approximately 36 gallons per minute pumped the water reaching the stilling well to an instrument shelter through a hose having a 1 inch interior diameter. The chlorinator supply comprised a commercially available 10% free chlorine solution sold under the trade name "GEMCHLOR," which was stored in a 20 liter container. The twenty liter supply of the 10% free chlorine solution was connected to the submerged intake by means of polyethylene tubing having a ⅜ inch interior diameter. The timing of the solenoid actuated clamp permitted approximately 250 milliliters of the described chlorine solution to drain to the intake horn once per day.

It was found that this daily dose of the 10% free chlorine solution was effective to eliminate slime development throughout the entire monitoring system, thus throughout the pipe which conveys the river water to the stilling well, throughout the stilling well, throughout the instrument shelter and, in particular, on all surfaces of the sensor and sample devices.

Although the preferred embodiment of this invention has been described, it will be understood that various changes may be made within the scope of the appended claims.

Having thus described my invention, I claim:

1. In the monitoring of wate wherein water is withdrawn from a source and conveyed through pipe means to a remote instrument for sensing a quality of water and then discharged remotely from and nonreturnably to said monitoring instrument, the method of retarding the growth of slime tending to adhere to said pipe means while periodically presenting said remote instrument with water representative of said source which comprises contacting the water substantially where withdrawn from said source with a biological poison at periods sufficiently spaced apart that water from said source which is substantially free of said poison will be presented to said sensing instrument between said spaced apart periods.

2. In a system for remotely monitoring a quality of water:
means for withdrawing the water to be monitored from a source of said water, a sensing instrument, means for conveying the water withdrawn from said source to said instrument, and means for remotely discharging said water from said instrument so that said water does not return to said instrument, the improvement comprising a supply of biological poison, and means for retarding slime development by periodically introducing poison from said supply to the water to be monitored substantially where the water is withdrawn from said source and for allowing water which is substantially free of said biological poison to be conveyed periodically from said source to said instrument by withholding poison from said water for substantial time intervals between said periodic introductions of poison to the water to be monitored.

3. The system of claim 2 wherein said withdrawing means includes an intake horn submerged in said source of water, and said means for periodically introducing poison introduces said poison to the interior of said intake horn.

4. The system of claim 3 wherein said source of water is a stream, said horn has an opening thereto facing downstream, and said horn diverges in the direction of stream flow.

5. The system of claim 2 including a stilling well, said withdrawing means comprising an intake horn submerged in said source of water and conduit means extending between said stilling well and said intake horn, said means for periodically introducing poison introducing said poison to said water before said water enters said stilling well.

6. The system of claim 5 wherein said means for conveying the water withdrawn from said source comprises a pump disposed in said stilling well.

7. The system of claim 6 including means to retard inflow of debris within said stilling well to said pump means.

8. The system of claim 7 wherein said means to retard is a sieve mounted on said pump means.

9. The system of claim 8 wherein said instrument elevationally higher than said stilling well, said pump is a backwashable pump, and including means to disable said pump whereby water approaching said instrument is permitted to backwash said pump and said sieve.

10. The system of claim 2 including automatic means for periodically extracting samples of the water being conveyed to said instrument.

11. The system of claim 10 including cycle timer means, said means for periodically introducing poison automatically responsive to said timer means, and including means automatically responsive to said timer means for disabling said sample extraction means during periods when said poison is present in the water conveyed by said conveying means to said instrument.

* * * * *

UNITED STATES PATENT OFFICE
CERTIFICATE OF CORRECTION

Patent No. 4,088,575             Dated May 9, 1978

Inventor(s) Jon D. Hilty

It is certified that error appears in the above-identified patent and that said Letters Patent are hereby corrected as shown below:

Column 7, line 11, "5/8" should be --3/8--.
Claim 1, line 1, "wate" should be --water--.
Claim 9, line 1, after "instrument" insert --is--.

Signed and Sealed this

Third Day of October 1978

[SEAL]

Attest:

RUTH C. MASON
Attesting Officer

DONALD W. BANNER
Commissioner of Patents and Trademarks